US006857607B1

(12) United States Patent
Burris

(10) Patent No.: US 6,857,607 B1
(45) Date of Patent: Feb. 22, 2005

(54) COLLAPSIBLE DISPLAY STAND

(76) Inventor: Jeff Burris, 4815 E. Main St., Suite 3, Mesa, AZ (US) 85205

(*) Notice: Subject to any disclaimer, the term of this patent is extended or adjusted under 35 U.S.C. 154(b) by 0 days.

(21) Appl. No.: 10/235,108

(22) Filed: Sep. 4, 2002

(51) Int. Cl.[7] .............................................. F16M 11/24
(52) U.S. Cl. ........................... 248/165; 248/164; 40/60
(58) Field of Search ............................ 248/165, 163.2, 248/164, 176.1, 175; 160/135; 40/610, 603, 604, 606.01, 606.13; 403/169, 170, 172, 176, 177, 178, 93

(56) References Cited

U.S. PATENT DOCUMENTS

| | | | | | |
|---|---|---|---|---|---|
| 1,646,305 | A | * | 10/1927 | Meyers | 40/603 |
| 1,765,057 | A | | 6/1930 | Dabrohua | |
| 1,870,798 | A | * | 8/1932 | Einson | 40/603 |
| 2,005,134 | A | * | 6/1935 | Emley | 40/603 |
| 2,160,457 | A | * | 5/1939 | Housman | 40/603 |
| 2,764,379 | A | | 9/1956 | Schmidt | |
| 2,805,504 | A | | 9/1957 | Stein | |
| 4,700,498 | A | | 10/1987 | Perutz et al. | |
| D. 390,879 | S | * | 2/1998 | Justen | D20/10 |
| 5,839,705 | A | * | 11/1998 | LaMotte | 248/165 |
| 5,983,545 | A | | 11/1999 | Marco | |
| 6,012,688 | A | * | 1/2000 | LaMotte | 248/165 |
| D. 434,806 | S | * | 12/2000 | Justen | D20/10 |
| 6,454,227 | B1 | * | 9/2002 | LaMotte | 248/165 |

* cited by examiner

*Primary Examiner*—Gwendolyn Baxter
(74) *Attorney, Agent, or Firm*—Schmeiser Olsen & Watts, LLP

(57) ABSTRACT

A collapsible display stand with a foot-and-bar base is disclosed. The foot-and-bar base provides improved adaptability to uneven surfaces. The foot provides a flexible connection between a vertical support member and two adjustable strut braces. The strut braces have controllable sliding connections to two flexed cross struts. The point of closest approach of the struts may be constrained by a grommet, clamp, sleeve, or motor bracket and maintained a predetermined distance from the foot by a vertical support member. Also disclosed is a simplified, inexpensive apparatus for connecting strut ends to mounting tubes. The simplified apparatus comprises a hole drilled in one side of the mounting tube near each mounting tube end, into which an unadorned strut end may be inserted. The foot, slidable strut brace connectors, and the point-of-closest-approach constraint may be economically made of hard rubber, such as that used in making mud flaps for trucks. The collapsible display stand may be adjusted by hand or, especially for very large embodiments, by motorized point-of-closest-approach and strut brace constraints. The motorized constraints may be remotely controlled. A variation of the display stand, adapted to being mounted on a wall, is also disclosed.

43 Claims, 6 Drawing Sheets

COLLAPSIBLE DISPLAY STAND

BACKGROUND OF THE INVENTION

Technical Field

This invention generally relates to a collapsible, free-standing, display stand for displaying panels, which may have designs thereon, such as banners. It relates more particularly to adjustable display stands.

Background

Display stands are used extensively at trade shows, conventions, and other gatherings to present images for advertising and informational purposes. The images are usually printed on flexible panels, such as reinforced paper, and are held in the desired display position by the display stand.

Users of display stands often travel from trade show to trade show to advertise their goods and services. Users must carry their display stands from place to place and set up and tear down their displays frequently. Different trade show locations may offer different limitations on available floor space and best viewing angle. Consequently, users want light weight, easy-to-assemble, adjustable, inexpensive, display stands.

The collapsible display stand of U.S. Pat. No. 5,839,705 to LaMotte uses bowed, telescopically connected cross struts to hold a banner in tension. Telescopic connections involve sliding a narrowed end of a first tube into an end of a second tube. Tubes are placed in end sleeves of a banner or similar display, and specially designed pin ends of the cross struts are inserted in specially designed end caps in the tubes, thus holding the banner in tension. The design is similar to tents using exterior telescopically connected crossed struts to hold up the tent, but with the tent removed and a banner in place of the tent floor. To erect the banner, a vertical support member connects at a top end to a strap around the crossing point of the struts. The bottom end of the vertical support member connects to two base support members which, in turn, connect to the end caps of the bottom tube, forming a rigid triangular base. The tilt of the banner off vertical is adjusted by sliding the crossing-point strap on the struts.

The detailed design of the connectors between the struts and the tubes adds to the cost of the LaMotte device. Also, the fixed triangular base prevents adjusting the base for horizontal display of a banner. Finally, the flat triangular base requires that the floor be substantially clear of obstacles (cabling, hoses, other equipment) over the area of the base.

Accordingly, what is needed is a collapsible display stand that is inexpensive to construct, has adjustable display angles, is adaptable to vertical or horizontal use with the same structural members, and can be placed in a stable configuration on an uneven surface.

SUMMARY OF THE INVENTION

A collapsible display stand with a foot-and-bar base is disclosed. The foot-and bar base provides improved adaptability to uneven surfaces. The foot provides a flexible connection between a vertical support member and two adjustable strut braces. The strut braces have controllable sliding connections to two flexed struts. The point of closest approach of the struts may be constrained by a grommet, clamp, or sleeve and maintained a predetermined distance from the foot by a vertical support member. Also disclosed is a simplified, inexpensive apparatus for connecting strut ends to mounting tubes. The simplified apparatus comprises a hole drilled in one side of the mounting tube near each mounting tube end, into which an unadorned strut end may be inserted. The foot, slidable strut brace connectors, and the point-of-closest-approach constraint may be economically made of hard rubber, such as that used in making mud flaps for trucks. The collapsible display stand may be adjusted by hand or, especially for very large embodiments, by motorized point-of-closest-approach and strut brace constraints. The motorized constraints may be remotely controlled. A variation of the display stand, adapted to being mounted on a wall, is also disclosed.

The foregoing and other features and advantages of the present invention will be apparent from the following more detailed description of the particular embodiments of the invention, as illustrated in the accompanying drawings.

BRIEF DESCRIPTION OF THE DRAWINGS

FIG. 1A-1 shows an enlargement of the connecting ends of two telescopically connecting vertical support member sections.

DETAILED DESCRIPTION OF EMBODIMENTS OF THE INVENTION

Figure 1A:
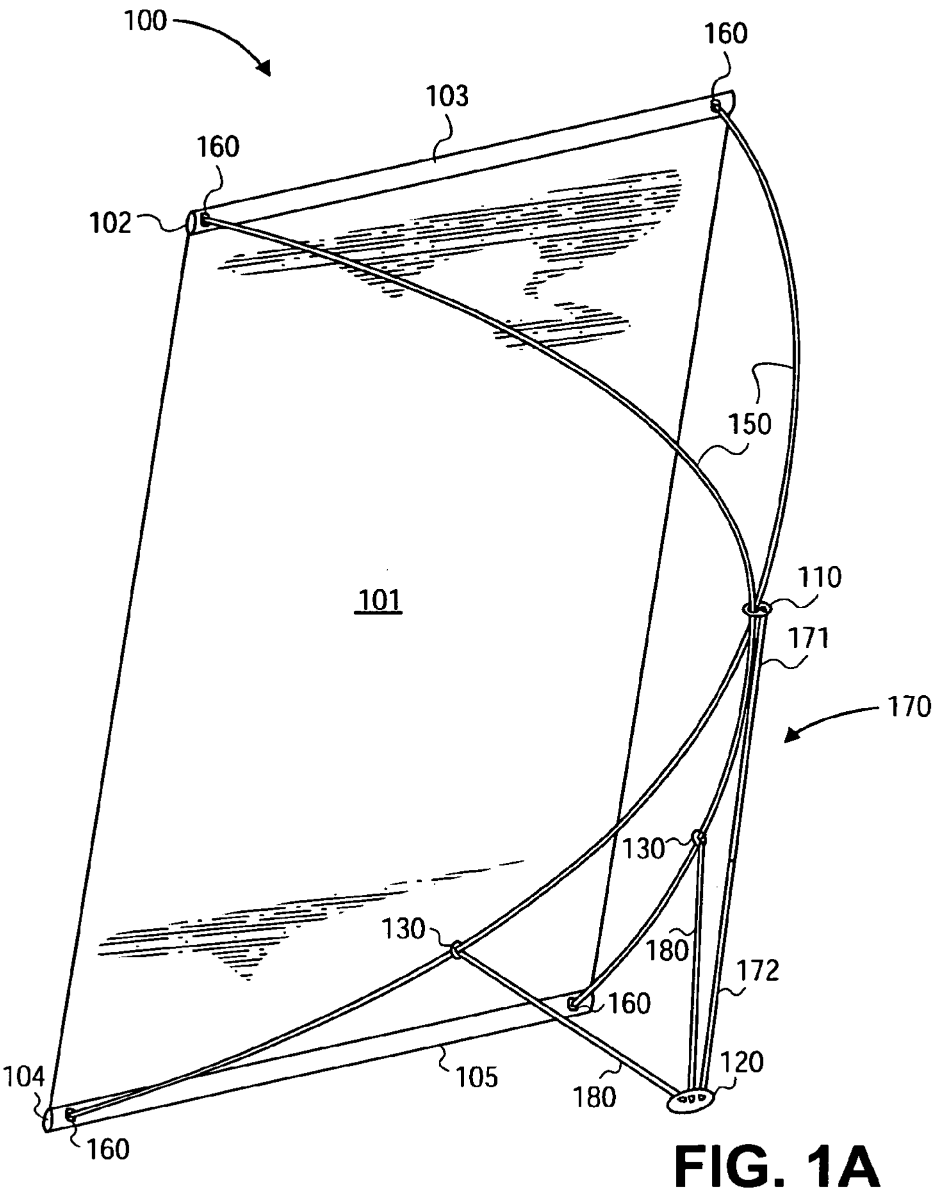
FIG. 1A shows an example of an embodiment of the collapsible display stand erected vertically.

FIG. 1A shows an example of an embodiment of a collapsible display stand 100. Two bowed struts 150 maintain the panel 101, or banner 101, in tension. The panel 101 is conventionally flexible but may be rigid or resilient. Mounting tubes 102 and 104, conventionally inserted through sleeves 103 and 105, respectively, in the banner 101 ends, may receive a strut 150 end in a hole 160 through the side of the mounting tube 102 and 104 near each end of the mounting tube 102 and 104. In the embodiment shown in FIG. 1A, the strut-receiving holes 160 in the tube 102 and 104 side are aligned with holes 103 and 105, respectively, in the sleeve. (See also FIG. 3A).

Figures 1, 1A:
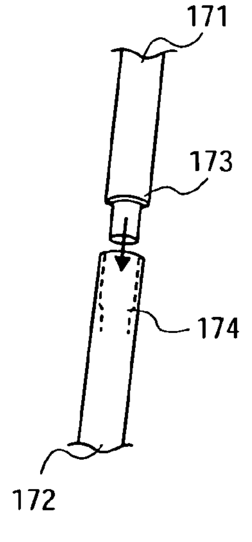

In an alternate embodiment, the mounting tube 102 and 104 extends beyond the ends of the banner sleeves 103 and 105, the strut-receiving hole 160 is in the portion of the tube 102 and 104 extending outside the banner sleeve 103 and 105, and the banner sleeve 103 and 105 requires no holes. (See also FIG. 3B). The mounting tubes 102 and 104 may be made of polyvinylchloride ("PVC") pipe. In variants, there is no banner sleeve 103 and 105, and the banner 101 is attached to the mounting tubes 102 and 104 by other means, such as loops, adhesives or clamps. In a particular embodiment, the banner 101 is mounted, not by tubes, but by bars 500 (FIGS. 5A and 5B) with integral clamps. The struts 150 may be flexible tubes comprised of telescopically connecting sections, as are often used for supporting umbrella tents. An example of a telescopic connection is shown in FIG. 1A-1. An end 173 of section 171 has a portion with a narrowed outside diameter that is slidingly received into a widened inside diameter of an end 174 of section 172, thereby making a telescopic connection. The tube sections may be threaded like beads on an elastic cord so that the connecting ends remain in proximity to each other when the sections of the struts 150 are pulled apart for transport or storage. Other types of struts 150 may also be used. For example, flexible rods, struts with polygonal, oval, or irregular cross-sections, I-beams, H-beams, and, in a particular embodiment, rigid, curved struts.

Figure 4:
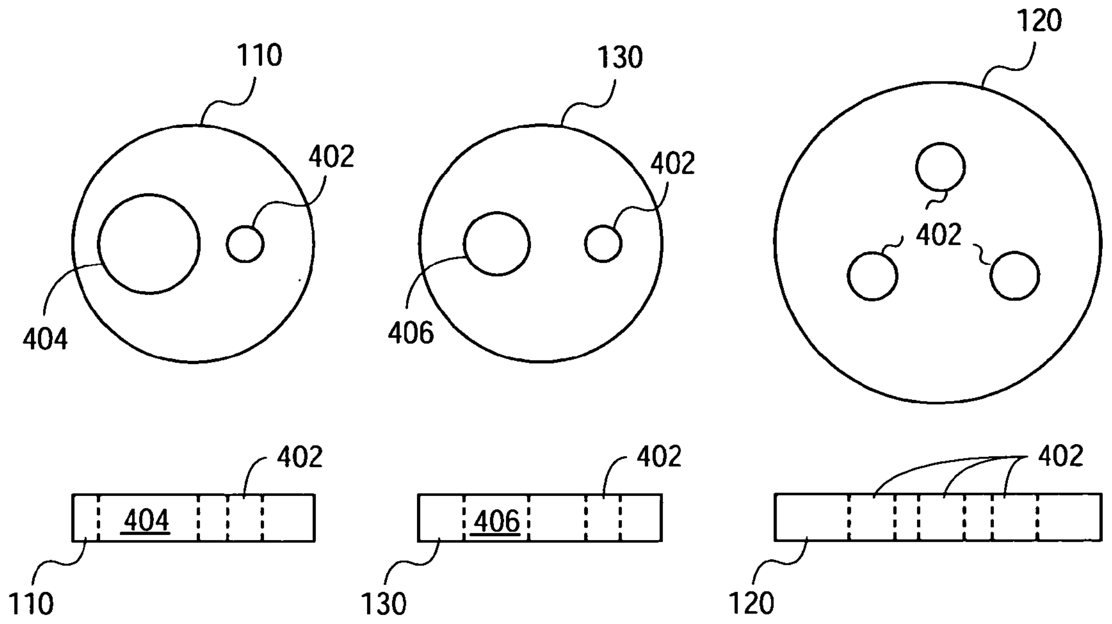
FIG. 4 shows three examples of devices used for maintaining strut relationships.

The struts 150 meet at a point of closest approach, shown in FIG. 1 as a crossing point, defined by a controllably slidable constraint 110, or restrictive device 110, such as a grommet, a sleeve, channel, clamp or a motorized restrictive device. The restrictive device 110 comprises engagement mechanisms for engaging struts 150 and vertical support member 170. In FIG. 1, a point-of-closest-approach grommet 110, or crossing-point grommet 110, is shown as an exemplary restrictive device. The grommet 110 may be preferably made of hard rubber, but may be of any tough, resilient, material with a high coefficient of friction. For example, a plastic, a softer rubber, or a silicone elastomer may be used. In the embodiment shown, the point-of-closest-approach grommet 110 has an engagement mechanism, a hole 404 (FIG. 4), of adequate size to slidingly engage both struts 150. In an alternate version, the point-of-closest-approach grommet 110 has two holes, one for slidingly engaging each strut 150. The point-of-closest-approach grommet also has a hole 402 for tightly engaging the neck of an end pin of a vertical support member 170. The end pin has a head tapered to a wider diameter than the engaging hole, and a neck sized to be tightly held by the engaging hole 402 (FIG. 4). The end pins may be custom made or purchased commercially. For example, Delrin Tips, manufactured by Frank Tehan Corporation of Berkeley, Calif. are suitable. In a particular embodiment, the vertical support member 170 may be machined to have a head and neck end. Because the grommet 110 is flexible, the attachment of the vertical support member 170 is a flexible attachment to the strut crossing point. For slidable constraints other than hard rubber grommets, the method of attaching the vertical support member 170 may be appropriately adapted.

A motorized point-of-closest-approach restrictive device may be used in embodiments that are too large to be adjusted by hand, or remotely located (near a ceiling in a convention hall, for example), or where animated tilting of the display 100 may be desired. A motorized restrictive device rides upon each strut 150 in the manner of a monorail using friction wheels, the motorized restrictive devices connected to each other to maintain a close distance and up to three degrees of rotational freedom between the struts 150. For example, a ball and socket connector may be used. For such an embodiment, struts having an “I-beam” cross sectional shape may be preferred. The motors may be controlled independently or in concert. The motors may be reversible. The engagement mechanisms for the motorized point-of-closest-approach restrictive device may comprise biased wheels or similar rollers.

Vertical support member 170 may be erected from two telescopically connecting tubes, 171 and 172. One tube 171 has a narrowed end 173 which is slidingly received in end 174 of tube 172. In most embodiments, the tubes 171 and 172 are threaded like strung beads on an axial elastic cord, as has long been known in the art of umbrella tents. Likewise, each strut 150 may be comprised of a plurality of telescopically connecting tube sections, with or without elastic cords. In an embodiment, the vertical support member may be mounted to or may be part of a vertical structure or wall, to enable wall-mounting of panels. The mounting may be accomplished by means of additional engagement mechanisms on the foot 120 and point-of-closest-approach restrictive device.

In a particular embodiment, each strut 150 is made of sections which are each shorter than the strut braces 180. When the strut brace 180 is adjusted to a position near a strut section connection point and the display stand is disassembled, the struts 150, vertical support 170, and strut braces 180 may all collapse into a package no longer than the strut braces 180. In particular embodiments, tube sections are sized to be nearly as long as the mounting tubes 102 and 104. The mounting tubes 102 and 104 often define the long dimension of a carrying case for the display stand 100. In some embodiments, even the mounting tubes may be made of telescopically connecting sections.

The bottom of the vertical support member 170 may be connected to the foot 120. The foot is shown as a hard rubber grommet 120 with three engagement mechanisms: end-pin-engaging holes 402 (FIG. 4). The bottom end of the vertical support member 170 has an end pin that may be engaged in a hole 402 in the foot 120. The other two holes 402 may be engaged by the end pins of the strut braces 180. The end pins of the strut braces 180 and the end pin of the vertical support members may all be inserted through the same side of the foot 120. The foot 120 twists in operation to adapt to the different positions of the strut braces 180 and the vertical support member 170. The pin head of the vertical support member 170 may rest on the floor or ground when the display stand 100 is erected. As an alternative to end pins, the vertical support member 170 may have machined ends.

Each end of each strut brace 180 which is not attached to the foot 120 is attached to a type of restrictive device: a strut brace slider 130. Slider 130 may be a grommet made of hard rubber, plastic, softer rubber, silicone, or similar flexible elastomeric material with a high coefficient of friction. The attachment to the strut brace slider grommet 130 may be by end pin, as above. The strut brace slider grommet 130 also has a hole 406 (FIG. 4) for slidingly engaging a strut 150. The strut brace slider 130 may be a motorized restrictive device, in a manner analogous to the point-of-closest-approach restrictive device.

With the strut braces 180 positioned as shown in FIG. 1A, the base is a bar-and-foot base 105, 104, and 120. This base needs only two generally level high points on the ground to support the bar 105 and 104 near the ends, and a small space, of greater or lesser elevation, for the foot 120. In a convention hall, for example, cables, junction boxes, and plumbing can run between the bar, 140 and 105, and the foot 120. In an outdoor setting, the bar-and-foot base can adapt easily to uneven terrain.

The struts 150, strut braces 180, and vertical support member 170 may all be of adjustable length. The adjustment may be manual. The simplest length adjustment is to add or subtract telescopically connected sections. Other length-adjusting mechanisms may be used. For example, the mechanisms known in the art for adjusting photographers tripod legs may be used for the vertical support and the strut braces. Alternatively, the adjustment may be motorized. For example, mechanisms known in the art of telescoping ladders may be adapted to the purpose. The mounting supports 102 and 104 may also be of adjustable length.

Figure 1B:
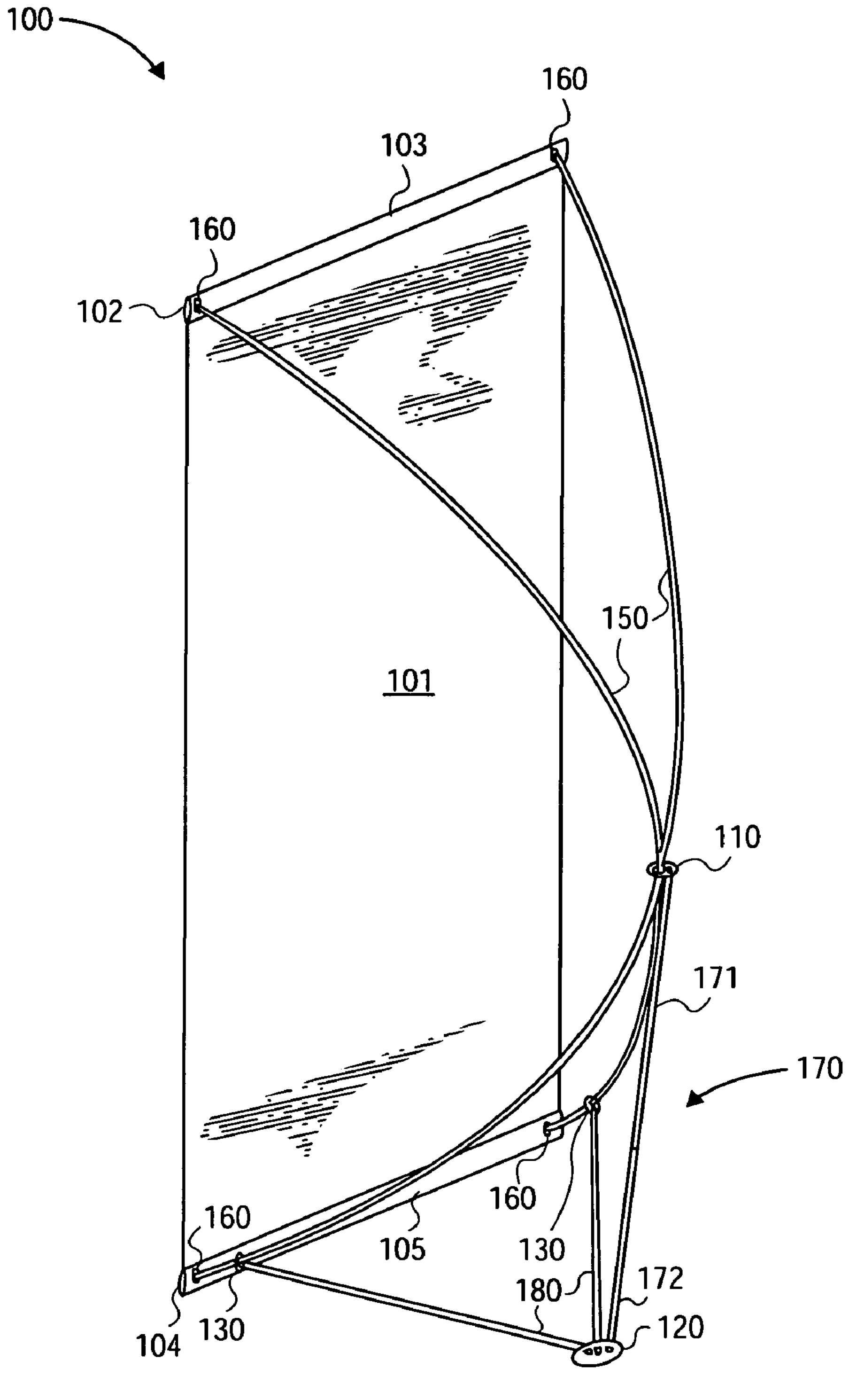
FIG. 1B shows an example of an embodiment of the collapsible display stand erected vertically with the strut braces adjusted downward.

FIG. 1B shows the display stand 100 with the strut braces 180 adjusted downward. This reduces the base area, while still allowing for some obstacles underneath the display stand 100. The lower adjustment brings the foot 120 closer to the bar 104 and 105. Differentially adjusting the strut supports 180 moves the foot 120 sideways. Thus, a variety of foundation problems can be adapted to with this collapsible display stand. For example, where a particular presentation angle for a displayed banner 101 is desired, but a floor obstacle interferes with the placement of the foot 120 at the desired presentation angle, a differential adjustment of the strut braces 180 may move the foot to avoid the obstacle, while preserving the presentation angle. Likewise, concurrent adjustment of the strut braces 180 may establish an obstacle-avoiding distance between the bar, 104 and 105, and the foot 120.

The tilt of the display panel 101 may be changed by sliding struts 150 concurrently through point-of-closest-approach grommet 110. Differentially sliding the struts 150 causes differential sliding of the strut braces 180 and will change the tilt and angle of the banner 101 and the relative position of the foot 120 and the bar 104 and 105. Good flexibility for tilting and angling is obtained with struts 150 that are about 10 percent longer than the diagonal distance between strut-receiving holes 160. When the struts 150 are the same length as the diagonal distance between strut-receiving holes 160, the display stand 100 is tilted and angled only by the strut braces 180.

The crossing point of the struts 150 used in an "X" configuration is one example of a point of closest approach. In an alternate embodiment, the struts 150 do not cross, but have a point of closest approach in an "H" configuration. In this embodiment, the point-of-closest-approach grommet 110 still operates to maintain the struts 150 in proximity at points between the strut ends. Improved stability in the "H" configuration may be obtained by using a restrictive device 110 with two separate strut holes and further by using two such restrictive devices 110 spaced a few inches apart, only one of which needs to be connected to the vertical support 170.

Figure 2:
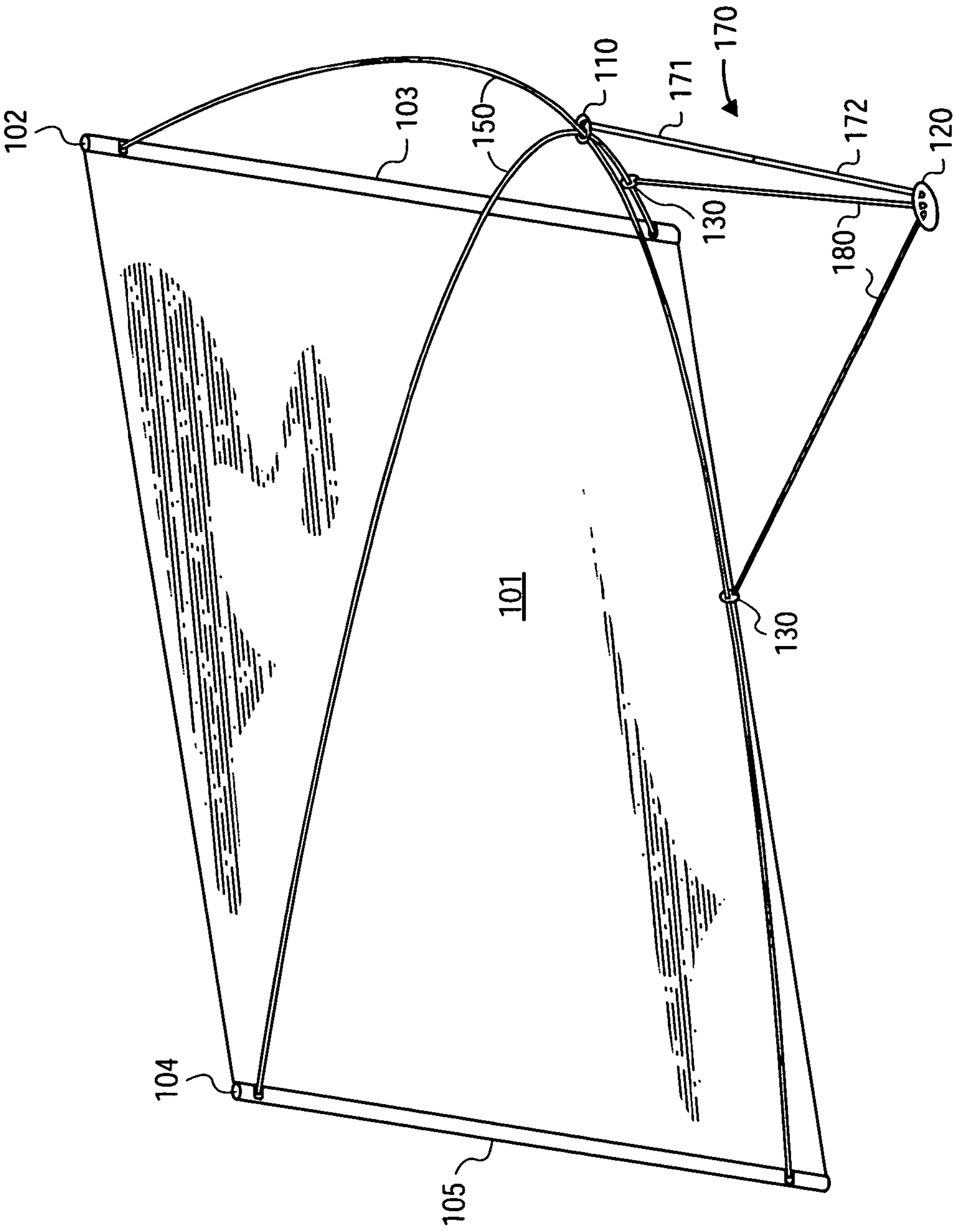
FIG. 2 shows an example of an embodiment of the collapsible display stand erected horizontally.

FIG. 2 shows the display stand used to display a horizontal banner 101. Notice that the same strut braces 180 are used for horizontal displays as for vertical displays (FIGS. 1A-B). In this variation of the exemplary embodiment of FIGS. 1A-1B, the mounting tubes 102 and 104 are on each side of the banner 101, rather than on the top and the bottom. Sliding strut braces 180 on the struts 150 and sliding the struts 150 through point-of-closest-approach grommet 110 have the same effects as for the vertical display, as discussed above. Thus, the same components work to create a stable, adaptable base for both vertical and horizontal displays.

Figure 3A:
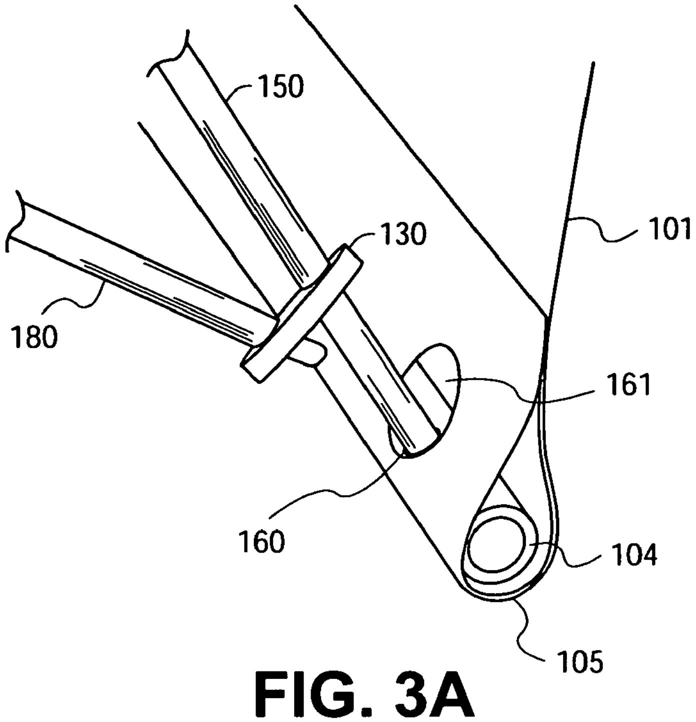
FIG. 3A shows an example of a strut inserted into a mounting tube through a hole in the banner sleeve.

FIG. 3A shows an enlargement of a mounting tube 104 in a sleeve 105 of banner 101, with a strut 150 inserted in a hole 160 in the mounting tube 104 through a hole 161 in the sleeve 105. Because storage and carrying cases for banners 101 conventionally have a longest dimension defined by the banner width, a mounting tube 104 that is no wider then the banner 101 imposes no new requirements on storage and carrying cases. Thus, the mounting tube 104 may be one piece of tubing. For example, mounting tube 104 may be a single piece of PVC pipe. In a particular embodiment, mounting tube 104 may be a solid rod with axial bores in each end. Strut 150 is shown with strut brace 180 adjusted downward. The strut brace slider grommet 130 is shown to slidingly engage strut 150 and fixedly engage strut brace 180.

Figure 3B:
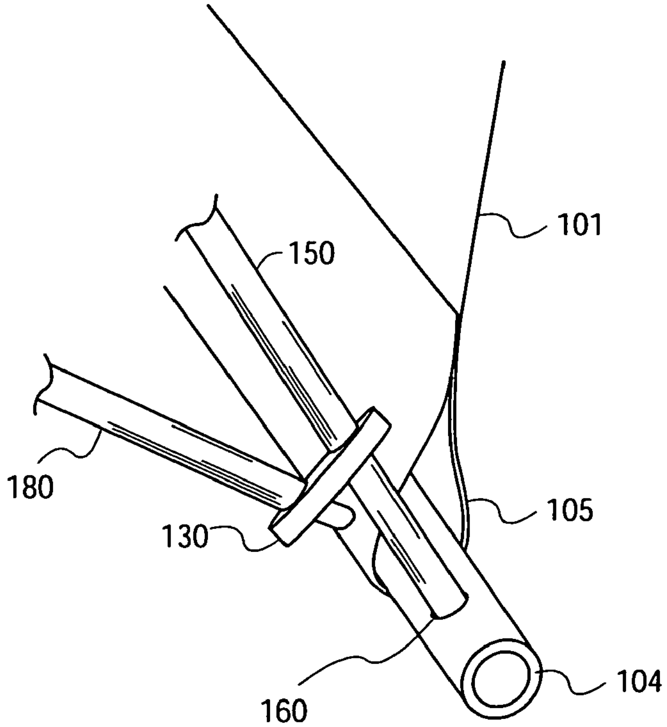
FIG. 3B shows an example of a strut inserted into a mounting tube through a hole in a portion of tube extended beyond the sleeve.

FIG. 3B shows an example of an alternate connection between strut 150 and mounting tube 105. Mounting tube 104 extends beyond the edge of sleeve 105 of banner 101. The hole 160 is in the extended portion of the mounting tube 104. Hole 160 may be drilled radially inward or may be at a deflection angle to a radial ray. Hole 160 may be a fraction larger than the outside diameter of the strut 150. For example, a hole 160 diameter of 1.25 times the outside diameter of the strut 150 works well. The flexed strut 150 engages inner and outer edges of the hole 160 with a prying force which holds the strut 150 in the hole 160.

FIG. 4 shows details of examples of restrictive devices for placing and maintaining struts 150, braces 180, and a vertical support member 170 in a desired relationship. In the embodiment shown in FIG. 4, the devices are a point-of-closest-approach grommet 110, a strut brace slider grommet 130, and a foot grommet, or foot, 120. The grommets 110, 120, and 130 are shown as round, but the exterior shape may be varied. For example, the shape may be a rectangle, triangle, other polygon, oval, irregular shape, or may contain resilient notches for holding folded strut sections for transport. Grommets 110, 120, and 130 may be made of a resilient material. For example, the hard rubber used to make mud flaps for trucks works well. Alternatively, softer materials such as plastic, softer rubber, or silicone may be used. It is advantageous to make the grommet of a material that has a high coefficient of friction for holding the smooth struts 150. Again, hard rubber works well. In many embodiments, the thickness of the grommet may correlate to the length of the pin necks. In some embodiments, the thickness of grommet is sized to provide sufficient friction to hold a strut brace 180 or vertical support member 170 without any end treatment.

Hole 404 in point-of-closest-approach grommet 110 has a diameter slightly less than twice the diameter of the struts 150. The struts 150 cross in the hole 404 and slightly deform the resilient grommet 110, causing the struts 150 to be held by the resilient force of the deformed material. Hole 402 in point-of-closest-approach grommet 110 receives the neck of an end pin of the vertical support member 170. The diameter of the hole 402 may be slightly less than the diameter of the pin neck so that the pin is resiliently held. Holes 402 in the strut brace slider grommet 130, the foot 120, and the point-of-closest-approach grommet 110 may be the same size, and the thickness of the grommets 110, 120, and 130 may be defined to be the length of the pin neck of the pins used. Pins may be those commercially available at camping supply stores. In variations of the exemplary embodiment, holes 402 may be of different sizes. Hole 404 and 402 are shown as aligned on a diameter, but the pattern may vary. The only requirement is that the deformation of one hole in use does not prevent use of the other hole.

In an alternate embodiment, the point-of-closest-approach restrictive device 110 has an additional engagement mechanism, distal the panel, for engaging a stabilizing object. For example, the apparatus may be mounted on a wall or other building structure by attaching the point-of-closest-approach grommet 110 and the foot 120 to the building structure. For further example, a portion of existing structure may serve as the vertical support member 170, wherein the foot 120 and the point-of-closest-approach grommet 110 may be attached to a wall, ceiling, column, wall strut, or the like, spaced apart a distance approximately equal to the length of a vertical support member 170, and the apparatus otherwise assembled as in embodiment 100.

Other restrictive devices for maintaining a point-of-closest-approach relationship may be used. The point-of-closest-approach relationship comprises crossing struts 150 that slide only when adjusted through a restriction (i.e., hole 404), the restriction maintains a user-determinable distance (i.e., by vertical support 170) from the foot 120. In an alternate embodiment, the vertical support member 170 may be of adjustable length. For example, a telescoping rod of fixable length may be used. Examples of other restrictive devices that may be used, alone or in combination, include clamps, sleeves, collars, channels (incomplete sleeves), and adherents. In a particular alternate embodiment, the point-of-closest-approach relationship may be maintained with at least one adapted restrictive device comprising dynamic engagement mechanisms, (i.e., friction wheels) and motors configured to adjust the point-of-closest-approach relationship by remote control. In a variant of the particular alternate embodiment, the length of vertical support 170 may be varied by remote control. In another particular embodiment, the lower mounting bar 104 may have one or more castors or other low-friction devices, the foot 120 may be anchored to the floor, and motorized restrictive devices may be controlled to animate the azimuth angle and tilt angle of the panel.

Strut brace slider grommet 130 may have a hole 406 and a hole 402. Hole 406 may have a diameter slightly larger than the outside diameter of a strut 150. The strut 150 engages the hole 406 at an angle and deforms the grommet 130, which then holds the strut 150 by resilient force. Hole 402 in strut brace slider grommet 130 holds the neck of an end pin of a strut brace 180.

Other restrictive devices for maintaining a strut brace relationship may be used. The strut brace relationship comprises maintaining a user-selectable point on a strut 150 a user-determinable distance (i.e., by 180) from the foot 120. In an alternate embodiment, strut braces 180 may be of adjustable length. For example, fixable telescoping tubes may be used. For most embodiments, the length may be adjusted manually. In some larger embodiments, the adjustment may be motorized, using mechanical linkages or pneumatics. Examples of other restrictive devices that may be used, alone or in combination, include clamps, sleeves, collars, channels (incomplete sleeves), and adhesives. In a particular embodiment, the strut brace relationship may be maintained with adapted restrictive devices comprising dynamic engagement means, (i.e., friction wheels) and motors configured to adjust the strut brace relationship by remote control.

Foot 120 flexibly maintains lower ends of the vertical support 170 and the strut braces 180 in proximity. In the exemplary embodiment of FIG. 4, the foot 120 comprises a hard rubber grommet having three engagement mechanisms 402, or holes 402, for receiving ends of the strut braces 180 and the vertical support 170, which ends may be end pins. The foot 120 deforms in use. All three end pins may be inserted from the same side. Other restrictive devices for maintaining the lower ends in a functional relationship may be used. For example, a block with drilled holes, wherein the block may be a block of resilient material. Various combinations of clamps, pivots, sleeves, and channels may also be used. In particular embodiments, a perforated tennis ball or tire may be a foot 120. The foot 120 may have additional engagement mechanisms (not shown) for receiving a tent peg or other stabilizing object to hold the foot 120 to a fixed spot on a surface.

Figure 5A:
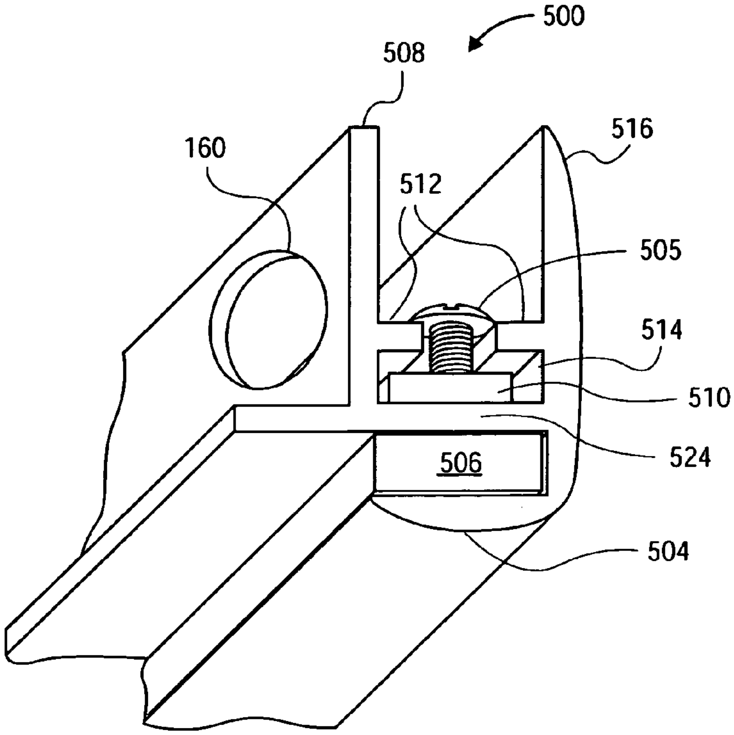
FIGS. 5A and 5B show two views of an example of an alternate banner mounting device.
Figure 5B:
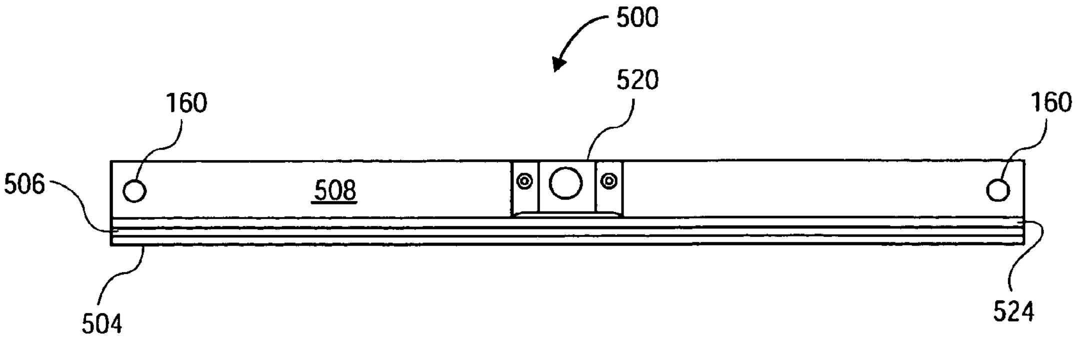

Refer now to FIGS. 5A and 5B. Other varieties of mounting hardware may be used. In an embodiment for banners 101 without sleeves 103 or 105, exemplary clamping bar 500 may be used in place of a mounting tube 104 and sleeve 105. The clamping bar 500 comprises a clamp anvil 504, a moveable clamp hammer 506, and means 505 for moving the clamp hammer 506 to fixedly and releasably engage an edge of a banner 101 between the clamp hammer 506 and clamp anvil 504. The clamping bar 500 further comprises a substantially rigid panel 508 having holes 160 near each end for receiving ends of struts 150. The means for moving the clamp hammer 506 may be a plurality of screws or bolts 505. In the exemplary embodiment of FIG. 5A, a square nut 510 slides into a channel 514 until nut 510 aligns with a screw hole (not shown). The channel 514 prevents rotation of the nut 510, and flanges 512 prevent the nut 510 from moving upward. The screw or bolt 505 engages the threads of the nut 510 and, screwed downward, engages the clamp hammer 506 and pushes it against the clamp anvil 504. With the banner edge between the clamp hammer 506 and the clamp anvil 504, the banner 101 (FIG. 1A) will maintain its relationship with the clamping bar 502.

A second panel 516 acts as a stop for strut 150 ends inserted into holes 160 in panel 508. In a particular embodiment, panel 516 exists only proximate to holes 160. In another particular embodiment, the clamping bar 502 may be made of extruded aluminum. In a variant of the particular embodiment, extruded channel, such as U-channel, may be adapted to make a clamping bar 500. Two advantages of the clamping bar 500 over the mounting tube 102 and 104 are 1) less banner paper may be used and 2) the mounting bar 500 may have fixtures for mounting lamps to illuminate the banner 101. A lamp mount 520 is shown in FIG. 5B. FIG. 5B shows a rear view of the clamp bar 500.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims. For example, collapsible display stands 100 may be adapted to be vertically stacked or placed on pedestals. For yet another example, the collapsible display stands 100 may be used for erecting non-flexible and/or non-image bearing panels, such as sunlight reflecting panels used in outdoor photography. Other embodiments may be adapted to erecting picture frames, flat-panel television sets, or solar-voltaic power arrays. Variation of materials is contemplated in the invention. For example, strips of bamboo may be used for making a picture frame support, and larger bamboo sections may be used for larger display stands. Any material with adequate strength and resiliency may be used.

What is claimed is:

1. A collapsible display stand for displaying a panel, the panel having first and second ends, the collapsible display stand comprising:

first and second resilient struts, each configured to extend from proximate the first end of the display panel to proximate the second end of the display panel, wherein the first and second resilient struts comprise a point of closest approach, at least one of the struts coupled proximate the point of closest approach to a first end of a vertical support member by a first restrictive device, the vertical support member having a second end;

first and second strut braces, each having a first end coupled to the second end of the vertical support member by a second restrictive device, and a second end adjustably coupled to one of the first and second resilient struts, respectively, by respective third and fourth restrictive devices, wherein the third and fourth restrictive devices are configured to maintain the respective second ends of the strut braces at an adjustable location on the first and second resilient struts; and first and second mounting devices, each adapted to engage an end of the panel and one of the first and second ends of the first and second resilient struts.

2. A collapsible display fixture for displaying a panel, the panel having first and second ends, the collapsible display stand comprising:

first and second resilient struts, each configured to extend from proximate the first end of the display panel to proximate the second end of the display panel, wherein the first and second resilient struts comprise a point of closest approach, at least one of the struts coupled proximate the point of closest approach by a first restrictive device, the first restrictive device configured to attach to an existing structure;

first and second strut braces, each having a first end coupled by a second restrictive device, the second restrictive device configured to attach to the existing structure a predetermined distance from the first restrictive device, and a second end adjustably coupled to one of the first and second resilient struts, respectively, by respective third and fourth restrictive devices, wherein the third and fourth restrictive devices are configured to maintain the respective second ends of the strut braces at an adjustable location on the first and second resilient struts; and first and second mounting devices, each adapted to engage an end of the panel and one of the first and second ends of the first and second resilient struts.

3. The apparatus of claim 1 or 2, wherein at least one of the resilient struts, the strut braces, the vertical support member, and the mounting devices further comprises a plurality of tubular sections, the sections adapted to be connected end-to-end.

4. The apparatus of claim 3, wherein the tubular sections are adapted to be connected telescopically.

5. The apparatus of claim 3, wherein at least one of the length of the mounting device and the length of a mounting device section comprises a length greater than any other section.

6. The apparatus of claim 3, wherein the length of at least one of the strut braces, the struts, the vertical support member, and the mounting devices, comprises an adjustable length.

7. The apparatus of claim 6, wherein the adjustable length comprises additional or fewer sections.

8. The apparatus of claim 1 or 2, wherein each of the first and second strut braces further comprises at least one end adapted to be received in the second restrictive device.

9. The apparatus of claim 1 or 2, wherein the vertical support member, the first restrictive device, and the second restrictive device maintain a distance relationship between the point of closest approach of the struts and the first ends of the strut braces.

10. The apparatus of claim 1, wherein the first end of the vertical support member comprises an end adapted to be received in the first restrictive device, and further wherein the second end of vertical support member comprises an end adapted to be received in the second restrictive device.

11. The apparatus of claim 1 or 2, wherein the third and fourth restrictive devices each comprise an engagement mechanism configured to at least one of frictionally, resiliently, dynamically, and slidingly engage at least one of the first and second struts.

12. The apparatus of claim 11, wherein each of the third and fourth restrictive devices further comprises an engagement mechanism configured to flexibly engage at least one of the first and second strut braces.

13. The apparatus of claim 12, wherein each of the third and fourth restrictive devices comprises a grommet, the grommet comprising a first hole sized and shaped for slidingly engaging the at least one of the first and second struts and a second hole sized and shaped for engaging the at least one of the first and second strut braces.

14. The apparatus of claim 13, wherein the size and shape of the hole for engaging the at least one of the first and second strut braces comprises a size and a shape adapted to engage a neck portion of an end pin of the at least one of the first and second strut braces.

15. The apparatus of claim 1 or 2, wherein the second restrictive device comprises at least three engagement mechanisms.

16. The apparatus of claim 15, wherein the second restrictive device comprises a grommet, the at least three engagement mechanisms comprising at least three holes through the grommet, the at least three holes sized and shaped for engaging at least the first and second strut braces and the vertical support member.

17. The apparatus of claim 16, wherein the size and shape of the at least three engagement mechanisms is adapted to engage neck portions of end pins of the first and second strut braces and the vertical support member.

18. The apparatus of claim 15, wherein the at least three engagement mechanisms comprises a fourth engagement mechanism, the fourth engagement mechanism adapted to engage a stabilizing object.

19. The apparatus of claim 1 or 2, wherein the first restrictive device comprises at least two engagement mechanisms, a first engagement mechanism configured to adjustably engage at least one of the first and second struts and a second engagement mechanism configured to engage the vertical support member.

20. The apparatus of claim 19, wherein the at least one strut comprises two struts.

21. The apparatus of claim 19, wherein the first restrictive device comprises a grommet, the grommet comprising at least two holes, at least one hole configured to adjustably engage at least one of the first and second struts and at least one hole configured to engage the vertical support member.

22. The apparatus of claim 21, wherein the size and shape of a first hole comprises a size and a shape adapted to at least one of frictionally, resiliently, flexibly, dynamically, and slidingly engage the at least one strut; and further wherein the size and shape of the second hole comprises a size and a shape adapted to engage the vertical support member.

23. The apparatus of claim 19, further comprising an engagement mechanism for engaging a stabilizing object.

24. The apparatus of claim 1 or 2, wherein the first and second mounting devices each comprises an engagement mechanism for engaging an end of at least one of the first and second struts.

25. The apparatus of claim 24, wherein the engagement mechanism comprises:

a hole drilled in a wall of the mounting device for receiving the end of at least one of the first and second struts; and a mechanism adapted to limit movement of the end of the strut through the hole;

the hole having inner and outer edges, the edges frictionally engaging the strut by a prying force.

26. The apparatus of claim 24, further comprising at least one low-friction device on at least one of the first and second mounting devices, the at least one low-friction device operative to enable movement of the panel in response to adjustment of at least one of the first and second struts and at least one of the first and second strut braces.

27. The apparatus of claim 1 or 2, wherein the restrictive devices comprise grommets, the grommets further comprising at least one of hard rubber, silicone rubber, plastic, and soft rubber.

28. The apparatus of claim 1, wherein the vertical support member comprises at least one attachment to an existing structure.

29. An apparatus for erecting a panel, the apparatus comprising a base, the base further comprising a bar and a foot, wherein the bar is coupled to first and second struts, the first and second struts are adjustably coupled to first and second strut braces, respectively, the first and second strut braces are flexibly coupled to the foot, wherein at least one of an angle made by the strut braces at the foot and a distance from the foot to the bar is adjustable by adjusting a position of at least one of the couplings between the strut braces and the strut.

30. The apparatus of claim 29, wherein the first and second struts are adjustably coupled through strut brace sliders, each slider controllable to select a point on a strut engaged by a strut brace.

31. The apparatus of claim 29, further comprising a point-of-closest-approach restrictive device engaged by a vertical support member, at least one strut positionally controllable relative to the point-of-closest-approach restrictive device to determine a point on the at least one strut at which to engage the point-of-closest-approach restrictive device.

32. An apparatus for erecting a panel, the apparatus having first and second mounting devices configured to retain the panel at the panel's ends and further having first and second struts to maintain the first and second mounting devices in a spaced apart configuration, the apparatus further comprising restrictive devices, wherein:

a first restrictive device adjustably couples at least one of the first and second struts to a first end of a vertical support member;

a second restrictive device flexibly couples a second end of the vertical support member to the first ends of first and second strut braces;

a third restrictive device adjustably couples a second end of the first strut brace to the first strut; and a fourth restrictive device adjustably couples a second end of the second strut brace to the second strut.

33. The apparatus of claim 32, wherein the first and second mounting devices comprise engagement mechanisms configured to each engage an end of the first strut and to engage an end of the second strut.

34. The apparatus of claim 32, wherein the restrictive devices are configured to be adjustable manually.

35. The apparatus of claim 34, wherein the restrictive devices are manually adjustable, the restrictive devices further comprising grommets.

36. An apparatus for erecting a collapsible display stand, comprising:

a first grommet, comprising a first hole configured to constrain a point of closest approach of two resilient struts, the two resilient struts coupled to mounting devices, the mounting devices manipulatable to retain ends of a panel to be displayed, the struts operative to maintain the mounting devices in a spaced-apart configuration, the first grommet further comprising a second hole configured to flexibly engage a first end of a vertical support member;

a second grommet, comprising at least three holes to fixedly engage two strut brace ends flexibly in proximity to a first end of a vertical support member; and third and fourth grommets, each having a first hole to adjustably engage a resilient strut and a second hole to fixedly engage a strut brace.

37. A method for manufacturing components of a collapsible display stand for erecting a panel, the display stand comprising first and second panel-retaining mounting devices held in a spaced-apart configuration by first and second struts, the method comprising the steps of:

forming two strut brace slider restrictive devices;

attaching a strut brace slider to each of two strut braces; and engaging a strut with each strut brace slider.

38. The method of claim 37, wherein the step of forming the at least one strut brace slider restrictive device comprises the step of forming a grommet.

39. The method of claim 37, further comprising the step of attaching at least one clamp to the mounting device.

40. A method for manufacturing components for a collapsible display stand for erecting a panel, the method comprising the steps of:

forming three types of grommets, comprising:

a point-of-closest-approach grommet having a first hole sized to adjustably engage at least one strut and a second hole adapted to attach to at least one of an existing structure and vertical support member;

a strut brace slider grommet having a first hole sized to adjustably engage a strut and a second hole adapted to attach to at least one strut brace;

a foot having first and second holes sized to engage strut braces, and a third hole adapted to attach to the at least one of the existing structure and the vertical support member.

41. The method of claim 40, further comprising the step of:

assembling a set of display stand parts, comprising:

the at least one strut;

the at least one strut brace; and at least one mounting device.

42. The method of claim 41, further comprising the step of assembling the vertical support member.

43. The method of claim 41, wherein the step of assembling the at least one strut comprises the step of assembling the at least one strut having a length at least ten percent greater than a diagonal distance between strut-receiving holes on installed mounting devices.

* * * * *